United States Patent [19]

Meier et al.

[11] Patent Number: 4,466,717
[45] Date of Patent: Aug. 21, 1984

[54] OPTICAL SYSTEM FOR LANTERN SLIDE PROJECTION

[75] Inventors: Ludwig Meier, Jena; Gebhard Kühn; Klaus-Dieter Scharf, both of Jena-Lobeda, all of German Democratic Rep.

[73] Assignee: Jenoptik Jena GmbH, Jena, German Democratic Rep.

[21] Appl. No.: 290,550

[22] Filed: Aug. 6, 1981

[30] Foreign Application Priority Data

Oct. 31, 1980 [DD] German Democratic Rep. ... 224866

[51] Int. Cl.³ .................................... G03B 21/00
[52] U.S. Cl. .................................... 353/122; 353/98; 353/94
[58] Field of Search ............... 350/96.1, 96.34, 96.28, 350/96.25; 362/32; 353/122, 121, 98, 99, 30, 33, 1, 81, 94, 62; 434/285, 286

[56] References Cited

U.S. PATENT DOCUMENTS

| | | | |
|---|---|---|---|
| 1,880,414 | 10/1932 | Capstaff | 353/81 X |
| 2,168,799 | 8/1939 | Korkosz et al. | 434/286 |
| 2,992,516 | 7/1961 | Norton | 350/96.25 X |
| 4,111,538 | 9/1978 | Sheridon | 353/122 |

FOREIGN PATENT DOCUMENTS

| | | | |
|---|---|---|---|
| 803753 | 1/1969 | Canada | 350/96.28 |
| 747917 | 10/1944 | Fed. Rep. of Germany | 353/81 |
| 320019 | 12/1930 | United Kingdom | 353/99 |

*Primary Examiner*—Harry N. Haroian
*Attorney, Agent, or Firm*—Jordan and Hamburg

[57] ABSTRACT

This invention relates to an optical system for lantern slide projection, especially for star projectors in planetariums, with the aim of increasing the available light for the projection. The development consists in attaining an increase in brightness and brilliance of the image as well as a reduction in heat generation in the apparatus, through the application of resonator principles.

The optical system comprises light sources, condensing lenses which reproduce the lamp filament, and the objective which reproduces the original. A resonator of high transparency which has highly reflective and/or totally reflective boundary surfaces is provided between condensing lens and objective. The boundary surface facing the condensing lens has a light-entrance opening comprising the lamp filament or the image of the lamp filament. The boundary surface lying opposite to that area preferably comprises the original to be projected.

The resonator is formed as a glass or hollow body with circular, elliptical or multi-faceted cross-section or as a polyhedron, hollow polyhedron or ball.

10 Claims, 6 Drawing Figures

OPTICAL SYSTEM FOR LANTERN SLIDE PROJECTION

BACKGROUND OF THE INVENTION AND PRIOR ART STATEMENT

The invention relates to an optical system for lantern slide projection, especially to a system for increasing brightness in projectors for the projection of stars in planetariums and similar devices.

From the book by Letsch, "Das Zeiss-Planetarium," Gustav Fischer Verlag Jena 1955, the off-print "Bild der Wissenschaft," Deutsche Verlagsanstalt Stuttgart 1977, and the "Jenaer Rundschau" (1967), issue No. 3, pages 177 to 1981 and (1968), No. 6, pages 345 to 349, it has been known in the planetarium industry to provide the projectors with hollow balls for the projection of fixed stars. A source of light assembled in a central position in each of the hollow balls provides all the projectors with light. Each projector is provided herein with a dia whose picture content contains small permeable fields in an absorbent material corresponding to the stars in the star field in question to be projected. These dias are illuminated by a source of light through associated lenses, the light traversing the openings projected by individual objectives onto the internal side of the dome.

Generally, all projections in which only a small portion of the light is used for image reproduction in view of the picture content of the original (as is the case in most projected objects in planetariums), have the disadvantage that the major portion of the light produced by the lamp is ultimately converted into undesirable heat. To improve brilliance and brightness of the projected images of the stars, it was necesary to install stronger light sources, which, in turn, resulted in increased heat generation.

Gas-discharge lamps have also been employed to increase brightness, which, however, make it necessary to provide all objectives with costly motor-driven diaphragms.

Individual projection systems have also been used in some planetariums, some having their own light source for projecting the brightest stars.

This invention, therefore, has the purpose of eliminating the disadvantages of the prior art, while increasing the portion of light in the projection.

SUMMARY OF THE INVENTION

By applying resonator principles to lantern slide projection in planetariums and similar devices, the invention is intended to achieve increased illumination and greater brilliance of the picture, while reducing heat generation within the apparatus.

According to the present invention, the object is accomplished by providing optical systems for lantern slide projection having one or several light sources, one or several condensing lenses, and one or several objectives, with a resonator of high transparency that is arranged in the path of rays between the condensing lens and the objective and has highly reflective and/or totally reflective boundary surfaces, of which the first boundary surface facing the condensing lens has a light-entrance opening in which the image of the lamp filament or the filament itself is situated, and the second boundary surface lies opposite such first boundary surface and preferably comprises the original to be projected.

It is advantageous here that the resonator is a body of glass with a circular, elliptical or multi-faceted cross-section, whose shell surfaces are totally reflective, and whose circular, elliptical or multi-faceted surfaces are provided with highly reflective coating.

Further, it is advantageous that the resonator is a polyhedron or a ball with highly reflective or totally reflective internal surfaces.

In one embodiment of the invention, the resonator is a hollow body whose boundary surface facing the light source is highly reflective and comprises a light-entrance opening, and wherein a first condensing lens is arranged in front of the boundary surface, with the light-entrance opening located in the rear focal plane; the second boundary surface lying opposite the first boundary surface envelops the original to be projected; a second condensing lens is assembled in front of the second boundary area in the resonator which infinitely reproduced the image of the lamp filament with the optical axes of both condensing lenses inclined by a small angle towards each other.

In order to achieve multiple use of the light for illumination of the original, it is advantageous to provide a prism or reflecting system in the plane of the boundary surface facing the light source that deflects the light by a small degree.

The resonator has the shape of an even-numbered polyhedron encompassing several associated light sources, condensing lenses and originals.

The invention, which involves multiple application of the light reflected in the resonator for illumination of the original, ensures a substantial increase in illumination, a reduction in heat formation and/or a heightening of the naturalism and brilliance in projection through reduction of the passage openings.

BRIEF DESCRIPTION OF THE DRAWINGS

The invention will now be described in more detail by way of examples of embodiments. In the drawing.

DETAILED DESCRIPTION OF PREFERRED EMBODIMENTS

Figure 1:
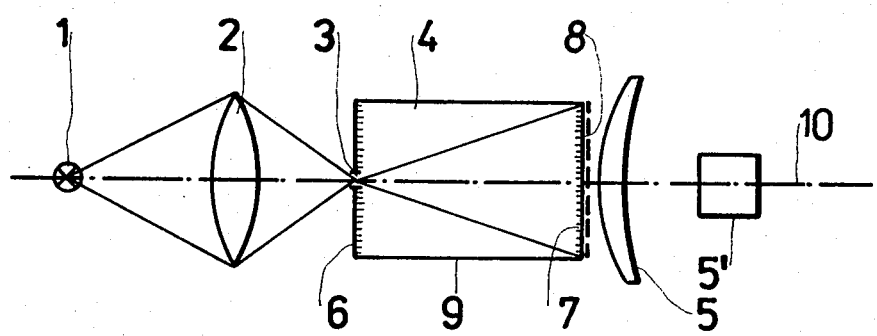
FIG. 1 illustrates an optical system.

The optical system for lantern slide projection represented schematically in FIG. 1 comprises a light source 1 and a condensing lens 2 which reproduces the lamp filament of a light source 1 in a light-entrance opening 3 of a resonator 4 arranged behind condensing lens 2. This resonator 4 is arranged between condensing lens 2 and an objective 5 and is preferably constituted of highly light-transparent glass material. The boundary surfaces of resonator 4 are highly reflective and/or totally reflective, in which the first boundary surface 6 facing condensing lens 2 has the light-entrance opening 3 which retains the image of the lamp filament. The second boundary surface 7 opposite the first boundary surface preferably contains the original 8 to be projected or a lantern slide. Especially in star projections for planetariums, this is a thin, highly reflective film into which holes of different diameters have been punched corresponding to the stars to be projected. For the sake of clarity, original 8 has been represented as a dotted line raised somewhat above the second boundary surface 7. In reality, it lies directly on this surface. The original 8 to be projected may also be vapor-deposited as a thin layer directly on boundary surface 7.

Resonator 4 itself is a body of glass which has a circular, elliptical or multi-faceted, cross-section. Its shell surfaces 9 are polished and wholly reflective, while boundary surfaces 6 and 7 are provided with highly reflective dielectric coating, which is only interrupted by light-entrance opening 3 in the first boundary surface 6, and by the holes in the second boundary surface 7.

Figure 2:
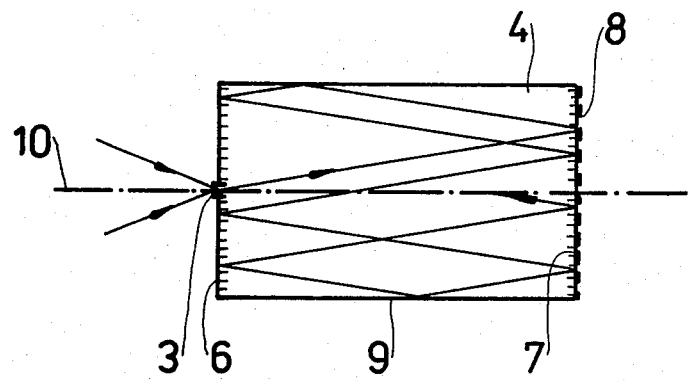
FIG. 2 illustrates the path of rays in a resonator.

FIG. 2 represents the path of rays inside resonator 4. The beam of rays originating from the picture of the lamp filament and crossing entrance opening 3 illuminates the surface of original 8. The light that does not strike the holes in original 8 is reflected by the original or by boundary surface 7. A ray entering resonator 4 in a given inclination to the optical axis maintains its inclination, e.g., it always falls sharply onto the highly reflective boundary surfaces 6 and 7 and always flatly onto the totally reflective shell surfaces 9. A high percentage of the light reflected off original 8 or boundary surface 7 is thereby directed back several times to original 8. Reflections of light rays terminate by again striking light-entrance opening 3.

If intensity $I_o$ had been available for illumination of the original in previously known projectors, the use of a resonator in the path of rays results in a light intensity I $$I = I_o \cdot (1 - p^n)/(1 - p),$$

wherein p represents the factor for a reduction of intensity between the mth and the (m+1)th incidence of the rays on original 8 and n the number obtained of repeated incidences of light on original 8. Thus the value $I = 9.6 \cdot I_o$ for intensity I results with the utilization of resonator 4, when, for instance, $p = 0.9$ and $n = 30$.

n here depends on the ratio between the diameter of the light-entrance opening 3 and the diameter of resonator 4, and p on the transparency of the resonator material as well as on the reflection coefficients of boundary surfaces 6 and 7 and the coefficients for total reflection of shell surface 9.

Figure 3:
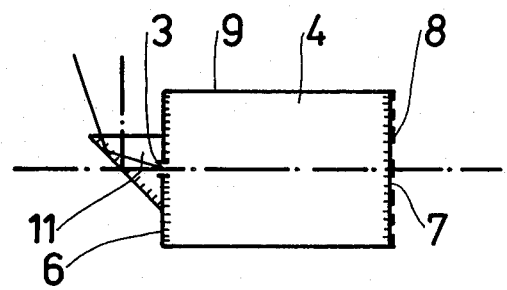
FIG. 3 illustrates a resonator with a deflecting prism.

FIG. 3 represents a resonator 4 on which a deflecting prism 11 is assembled on boundary surface 6 encompassing light-entrance opening 3.

Figure 4:
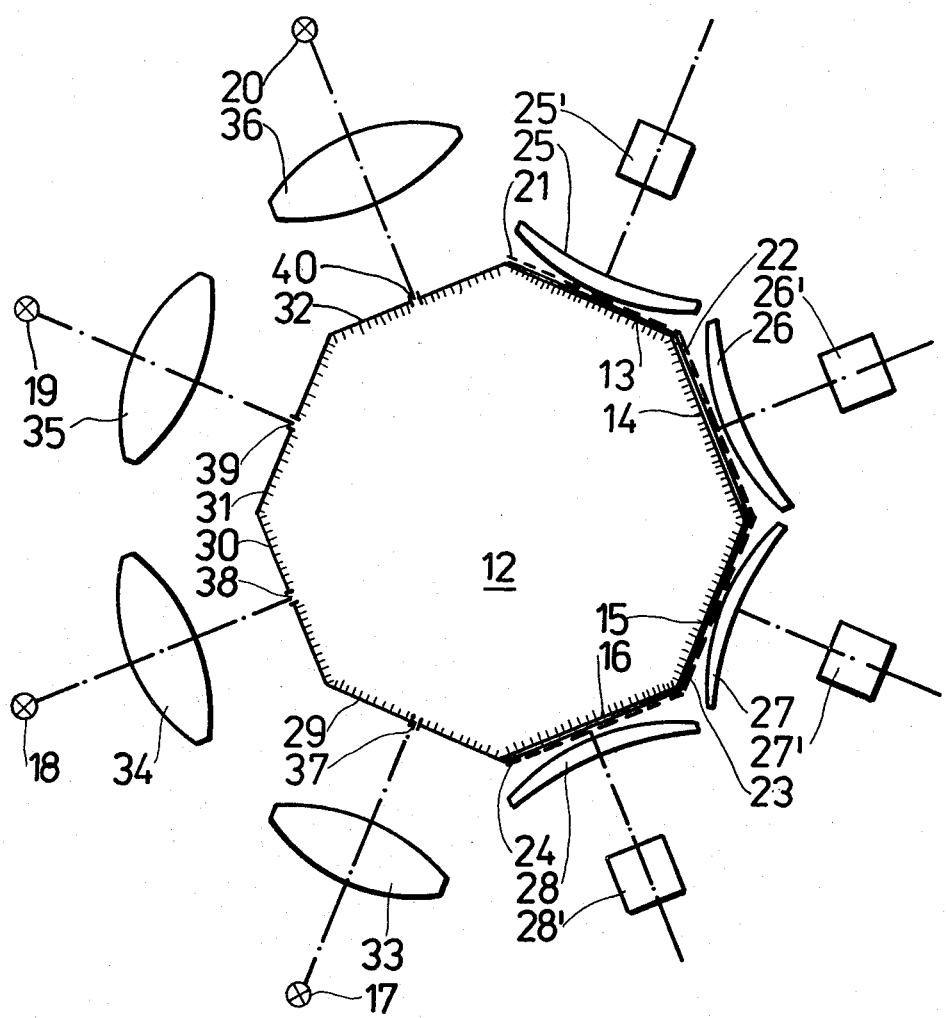
FIG. 4 illustrates an optical system with a polyhedron resonator.

The arrangement of projectors around a resonator 12 has been represented schematically in FIG. 4. It comprises a resonator 12 which is in the shape of a polyhedron with highly reflective or totally reflective polyhedral surfaces. One half of the polyhedral surfaces 13, 14, 15, 16 which in their construction and effect correspond to boundary surface 7 in FIG. 1, and which lie on the side of resonator 12 that is turned away from light sources 17, 18, 19, 20, has been formed to be highly reflective; originals 21, 22, 23, 24, for example the star plates, are located on them. The projection objectives 25, 25'; 26, 26'; 27, 27'; and 28, 28' are arranged after the same, in the direction of the light.

The polyhedral surfaces 29, 30, 31, 32 lying opposite the polyhedral surfaces 13, 14, 15, 16, facing the light sources 17, 18, 19, 20 and the condensing lenses 33, 34, 35, 36 attributed to them, are equally coated to be highly reflective and each one is conveniently provided with a light entrance opening 37, 38, 39, 40 in its middle. The operation of this resonator 12 is the following: initially the direct illumination of originals 21, 22, 23, 24 takes place. However, each ray striking originals 21, 22, 23, 24 still strikes the originals several more times. The resonator may also be in the shape of a sphere or, to prevent light losses, an optical resonator condensing lens may be additionally inserted at the place of the objective, for instance condensing lenses in the vicinity of the reflecting originals.

Similarly, lamps of correspondingly smaller dimensions may even be assembled at the noted place of the lamp-filament images. The operation is similar to that in the examples noted.

Figure 5:
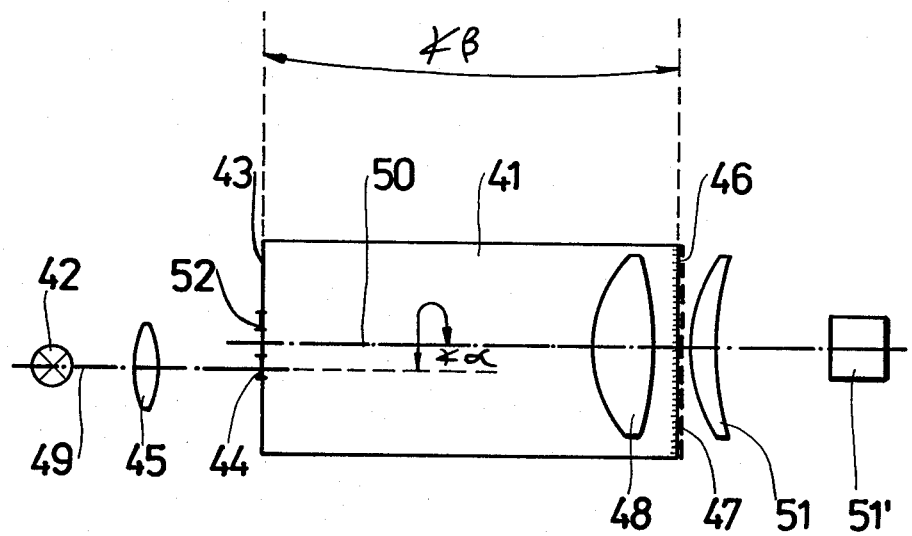
FIG. 5 illustrates a ray-deflecting system in the focus of an optical condensing lens.

In the optical system represented in FIG. 5, resonator 41 is a hollow body whose boundary surface 48 facing light source 42 is highly reflective and comprises a light-entrance opening 44. A first consensing lens 45 is arranged between resonator 41 and light source 42 to produce a filament image in light-entrance opening 44. Boundary surface 46 lying opposite boundary surface 43 includes the original 47 to be projected which is formed highly reflective and is conveniently assembled on boundary surface 46. A reproduction system is arranged as a second condensing lens 48 in resonator 41, observed in the direction of light, in front of boundary area 46, which infinitely reproduces the lamp filament image situated in light-entrance opening 44. Optical axes 49 and 50 of condensing lens 45 and 48 form a small angle between themselves. An objective 51, 51' has been arranged behind the whole arrangement for projecting original 47.

Original 47 is illuminated upon projection over the two condensing lenses 45 and 48. The image reflected at the original forms an intermediate filament image 52 through lens 48. The original is again illuminated through reflection on the reflecting boundary surface 43, which is slightly inclined towards surface 46 to prevent vignetting.

Figure 6:
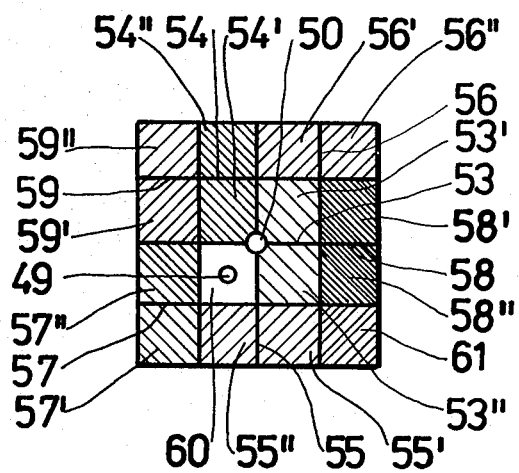
FIG. 6 illustrates a top view of a prism-reflecting system.

A reflecting or prism system is assembled in the vicinity of plane 43, of which a top view is represented in FIG. 6, to make it possible to repeat this procedure several times. In this example, the light reaches the resonator through open field 60, proceeding over the system condensing lens 48, original 47, condensing lens 48 to reflecting surface 53', from where it returns over reflecting surface 53" to condensing lens 48.

Finally, the light in this prism or reflecting system successively crosses the surfaces 60, 53', 53", 54', 54", 55', 55" etc. up to a plane mirror 61 and then back over 59", 59', 58", 58', 57", 57' etc. up to field 60 so that the original is illuminated for a total of sixteen times in this example.

The resonator may have the form of an even numbered, hollow polyhedron similar to the system in FIG. 4, with which several light sources, condensing lenses and originals are associated in this case. In this embodiment, the reflecting or prism system is arranged on the boundary surfaces facing the light sources, with originals on the boundary surfaces lying opposite the first boundary surfaces. The path of rays for repeated illumination of the originals runs in a direction described in connection with FIGS. 5 and 6 for each original.

We claim:

1. An optical system for projection, comprising
   (A) a condensing lens,
   (B) an objective, and (C) a reflective resonator, arranged between said condensing lens and said objective, said resonator comprising
  (1) a highly reflective surface reflecting toward the objective, said surface being disposed adjacent to said condensing lens,
  (2) an opening in said surface for admitting light into the resonator,
  (3) a second highly reflective surface opposite said first surface containing an object to be projected, and
  (4) at least one substantially totally reflective surface enclosing said first and second surfaces.

2. The system of claim 1 in which said object to be projected is disposed directly on said second surface opposite said first surface.

3. The system of claim 1 additionally comprising a condensing lens within said resonator.

4. The system of claim 3 in which optical axes of both condensing lenses are inclined towards one another.

5. The system of claim 4 in which said first highly reflective surface is slightly inclined toward said second highly reflective surface to prevent vignetting.

6. The system of claim 1 in which said resonator is in the shape of a polyhedron with a plurality of highly reflective and substantially totally reflective surfaces, and respective openings, condensing lenses, and objectives arranged about said resonator.

7. The system of claim 7 in which said resonator is elliptical in shape.

8. The system of claims 6 or 7 in which said resonator is constructed of glass.

9. The system of claims 6 or 7 in which said highly reflective surfaces of said resonator are coated with a highly reflective material.

10. The system of claim 6 comprising
  (D) four sources of light,
  (E) four condensing lenses, each lens positioned between a respective source of light and highly reflective surface, and
  (F) four objectives, each projection objective positioned by a respective highly reflective surface opposite a respective highly reflective surface.

* * * * *